(12) United States Patent
Nagaoka et al.

(10) Patent No.: US 12,419,726 B2
(45) Date of Patent: Sep. 23, 2025

(54) METHOD OF COLORING DENTAL BLOCK AND DENTAL BLOCK

(71) Applicant: GC Corporation, Shizuoka (JP)

(72) Inventors: Kento Nagaoka, Tokyo (JP); Mizuho Onodera, Tokyo (JP); Koji Yamamoto, Tokyo (JP); Yusuke Hokii, Tokyo (JP); Shigenori Akiyama, Tokyo (JP)

(73) Assignee: GC Corporation, Shizuoka (JP)

( * ) Notice: Subject to any disclaimer, the term of this patent is extended or adjusted under 35 U.S.C. 154(b) by 0 days.

(21) Appl. No.: 18/690,861

(22) PCT Filed: Aug. 24, 2022

(86) PCT No.: PCT/JP2022/031831
§ 371 (c)(1),
(2) Date: Mar. 11, 2024

(87) PCT Pub. No.: WO2023/053789
PCT Pub. Date: Apr. 6, 2023

(65) Prior Publication Data
US 2024/0423764 A1    Dec. 26, 2024

(30) Foreign Application Priority Data
Sep. 30, 2021 (JP) .................. 2021-162425

(51) Int. Cl.
*A61C 13/08* (2006.01)
*A61C 8/00* (2006.01)
*A61C 13/00* (2006.01)

(52) U.S. Cl.
CPC ........ *A61C 13/082* (2013.01); *A61C 13/0022* (2013.01); *A61C 2201/002* (2013.01)

(58) Field of Classification Search
CPC ..................................................... A61C 19/10
See application file for complete search history.

(56) References Cited

U.S. PATENT DOCUMENTS

| | | | |
|---|---|---|---|
| 2008/0241551 A1 | 10/2008 | Zhang et al. | |
| 2016/0038381 A1* | 2/2016 | Jahns .................. | C04B 38/0074 |
| | | | 252/301.36 |
| 2017/0157645 A1* | 6/2017 | Wolz .................. | A61C 13/0006 |
| 2018/0028295 A1 | 2/2018 | Kadobayashi et al. | |
| 2019/0233340 A1* | 8/2019 | Kim .................... | C04B 41/5007 |

FOREIGN PATENT DOCUMENTS

| | | |
|---|---|---|
| CN | 104337586 | 2/2015 |
| JP | 2018-143393 | 9/2018 |
| JP | 2021-115274 | 8/2021 |
| WO | 2014/164199 | 10/2014 |
| WO | 2014/206439 | 12/2014 |

OTHER PUBLICATIONS

International Search Report for PCT/JP2022/031831 mailed on Nov. 8, 2022.

* cited by examiner

*Primary Examiner* — Cachet I Proctor
(74) *Attorney, Agent, or Firm* — IPUSA, PLLC

(57) ABSTRACT

In a method of coloring a dental block by which a coloring liquid penetrates into the dental block including a top surface, a bottom surface, and a side surface, the method includes covering at least a portion of the side surface with a covering material over an entire circumference of the portion, exposing the top surface and the bottom surface, and causing the coloring liquid to penetrate from the top surface or the bottom surface.

8 Claims, 6 Drawing Sheets

METHOD OF COLORING DENTAL BLOCK AND DENTAL BLOCK

FIELD OF THE INVENTION

The present invention relates to a method of coloring a dental block, and the dental block.

BACKGROUND OF THE INVENTION

A dental block is composed of a molded article of ceramic materials, and a dental prosthesis having a desired shape can be obtained by cutting the molded article by a technology such as CAD/CAM (for example, Patent Document 1) and the like.

In recent years, as a dental block, for the purpose of imparting aesthetics to the dental prosthesis, a coloring block in which a block material is colored with a dye in advance and a gradation block in which a gradient (gradation) is added to the coloring block have been developed (for example, FIG. 10, Patent Document 2).

PRIOR ART DOCUMENT

Patent Documents

[Patent document 1] Japanese Patent Application Laid-Open No. 2021-115274
[Patent document 2] U.S. Patent Application Publication No. 2019/0233340

SUMMARY OF THE INVENTION

Problems to be Solved by the Invention

However, in the conventional dental block, the colored surface tends to be curved, and the desired aesthetics cannot be obtained.

The present invention is to provide a dental block in which a colored surface of the dental block does not readily curve.

Means for Solving the Problems

In a method of coloring a dental block according to one embodiment of the present invention, the method of coloring a dental block by which a coloring liquid penetrates into the dental block including a top surface, a bottom surface, and a side surface, the method includes covering at least a portion of the side surface with a covering material over an entire circumference of the portion, exposing the top surface and the bottom surface, and causing the coloring liquid to penetrate from the top surface or the bottom surface.

Effect of the Invention

According to one aspect of the present invention, the present invention is capable of providing a dental block in which a colored surface of the dental block is not easily curved.

EMBODIMENT OF THE INVENTION

Hereinafter, embodiments of the present invention will be described in detail.

Methods of Coloring a Dental Block

First Embodiment

Figure 1:
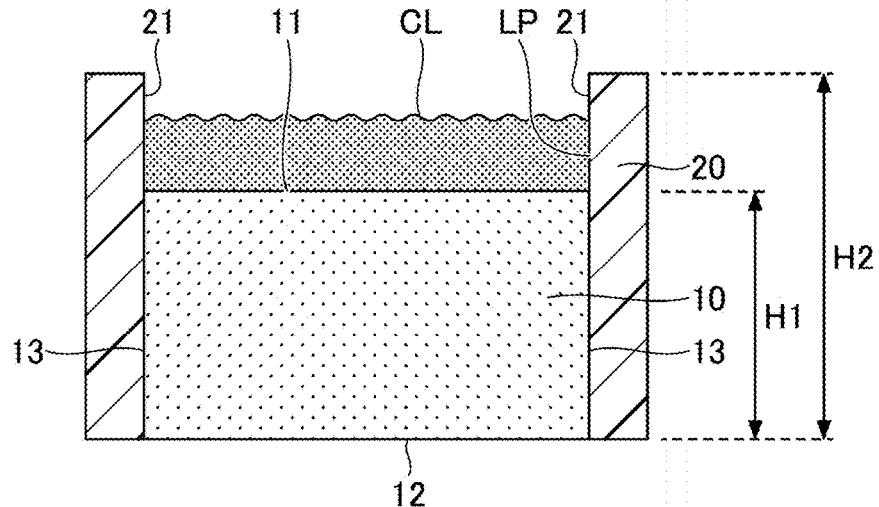
FIG. 1 is a cross-sectional view illustrating a first embodiment of a method of coloring a dental block.
Figure 2:
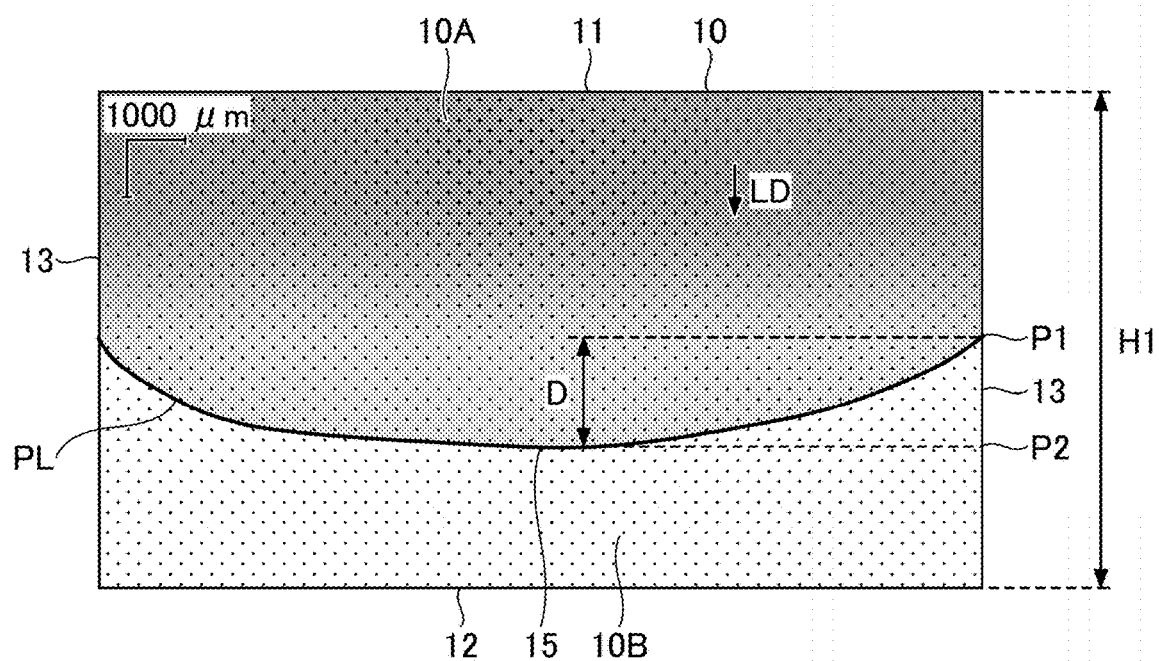
FIG. 2 is a view illustrating a side surface of the dental block colored in the first embodiment.

FIG. 1 is a cross-sectional view illustrating a first embodiment of a method of coloring a dental block, and FIG. 2 is a view illustrating a side surface of the dental block colored in the first embodiment. The method of coloring the dental block according to the first embodiment is to penetrate a coloring liquid CL into a dental block 10.

In the present specification, a dental block, also referred to as a blank, is a dental material used in an application such as a dental prosthesis. The dental block is a molded body obtained by compressing a ceramic powder into a mold, or a temporarily fired body obtained by temporarily firing (for example, heating in a range of 600° C. to 1500° C.) the molded body. The temporarily fired body is a state in which the ceramic powder particles are temporarily adhered to each other, and the particles have a continuous porous structure through which a coloring liquid described later can penetrate.

The dental block is cut by computer-aided design/computer-aided manufacturing (CAD/CAM) and the like to be formed into a dental prosthesis, and if necessary, the dental block is fired (for example, heating in a range from 1100° C. to 2100° C.) after cutting.

The ceramics also include glass containing silicate, borosilicate, aluminosilicate, phosphate, fluorophosphate, or the like and glass ceramics thereof; zirconia; alumina; feldspar; leucite; sanidine; spinel; mica; apatite; zircon; or mixtures thereof.

The dental block to be colored may be colored in a form of either a molded body (molded body before temporary firing) or a temporary fired body (molded body after temporary firing). However, the coloring of the dental block is preferably performed after temporary firing of the molded body but before fully firing the molded body from the viewpoint of blending the coloring with the dental block.

As illustrated in FIG. 1, the first embodiment includes a dental block 10, a covering material 20, and a coloring liquid CL.

The dental block 10 includes a top surface 11, a bottom surface 12, and a side surface 13. The top surface 11 is an upper surface in the height direction (gravity direction), and the bottom surface 12 is a lower surface in the height direction. The side surface 13 has four rectangular surfaces if the shape of the dental block 10 is a rectangular prism shape, and one curved surface if the shape is a cylindrical shape. The dental block 10 has a height H1 in the height direction.

The covering material 20 is a member to cover the side surface 13 of the dental block 10 when the dental block 10 is colored. At least a part of the side surface 13 of the dental block 10 is covered with the covering material 20 over the entire circumference. In the first embodiment, the entire side surface 13 of the dental block 10 is covered with the covering material 20 in a state in which the top surface 11 and the bottom surface 12 of the dental block 10 are exposed (a state in which the top surface and the bottom surface are exposed).

The covering material 20 has a height H2 in the height direction. In the first embodiment, the height H2 of the covering material 20 is higher than the height H1 of the dental block 10.

The shape of the covering material 20 is not particularly limited. For example, if the shape of the dental block 10 is a rectangular prism shape, the shape of the covering material 20 is a hollow rectangular prism shape with both ends open. If the shape of the dental block 10 is a cylindrical shape, the shape of the covering material 20 is a hollow cylindrical shape with both ends open.

The material of the covering material 20 is not particularly limited, but for example, silicone rubber, resin, wax, and the like. It should be noted that the covering material 20 is preferably a flexible material in that adhesion with the dental block 10 is enhanced when covering the side surface 13 of the dental block 10, and further, silicone rubber or the like is preferable among the flexible materials from the viewpoint of chemical resistance against the coloring liquid CL.

The coloring liquid CL includes a dye and a liquid.

The dye is not particularly limited. Examples of the dye include iron chloride, erbium chloride, and the like.

The liquid is not particularly limited. Examples of the liquid include water, polyethylene glycol, and the like.

The coloring liquid CL penetrates from the top surface 11 or bottom surface 12 of the dental block 10.

In the first embodiment, the coloring liquid CL penetrates from the top surface 11 of the dental block 10. Specifically, the covering material 20 is brought into close contact with the side surface 13 of the dental block 10 in a state in which the covering material 20 projects upward from the top surface 11 of the dental block 10, thereby constituting a wall 21 and forming a liquid pool LP in the space formed by the top surface 11 of the dental block 10 and the covering material 20. When the coloring liquid CL is pooled in the liquid pool LP, the coloring liquid CL penetrates into the dental block 10 from the top surface 11 (FIG. 1).

When the coloring liquid CL penetrates into the dental block 10 from the top surface 11, as illustrated in FIG. 2, a colored region 10A close to the top surface 11 of the dental block 10 and a non-colored region (non-colored region) 10B close to the bottom surface 12 of the dental block 10 are formed.

A boundary surface PL between the colored region 10A and the non-colored region 10B constitutes a curved shape whose cross-sectional shape of the dental block 10 becomes convex towards the bottom surface 12. That is, the boundary surface PL constitutes a curved surface. Hereinafter, the boundary surface PL is called a curved surface or a colored surface, and the cross-section of the curved surface of the boundary surface PL may be called a curved line.

The distance from the top surface 11 of the dental block 10 to the curved surface (curved line of the cross-section) of the boundary surface PL (distance where the coloring liquid CL penetrates) is longer at a boundary P2 close to a center 15 of the dental block 10 than at a boundary P1 close to the side surface 13 of the dental block 10. That is, the curved surface (curved line of the cross-section) of the boundary surface PL is formed such that the distance D between the boundary P1 close to the side surface 13 and the boundary P2 close to the center 15 of the dental block 10 increases from the side surface 13 of the block 10 toward the center 15.

In the first embodiment, as described above, at least a part of the side surface 13 (all of the side surface 13 in FIG. 1) is covered with the covering material 20 in a state in which the top surface 11 and the bottom surface 12 are exposed, and the coloring liquid CL penetrates from the top surface 11. As a result, the distance D between the boundary P1 close to the side surface 13 and the boundary P2 close to the center 15 can be shortened (FIG. 1 and FIG. 2).

Thus, in the first embodiment, a dental block in which the boundary surface (colored surface) PL between the colored region 10A and the non-colored region 10B does not readily curve can be provided. As a result, in the first embodiment, deterioration of aesthetics can be prevented (FIG. 2).

Second Embodiment

Figure 3:
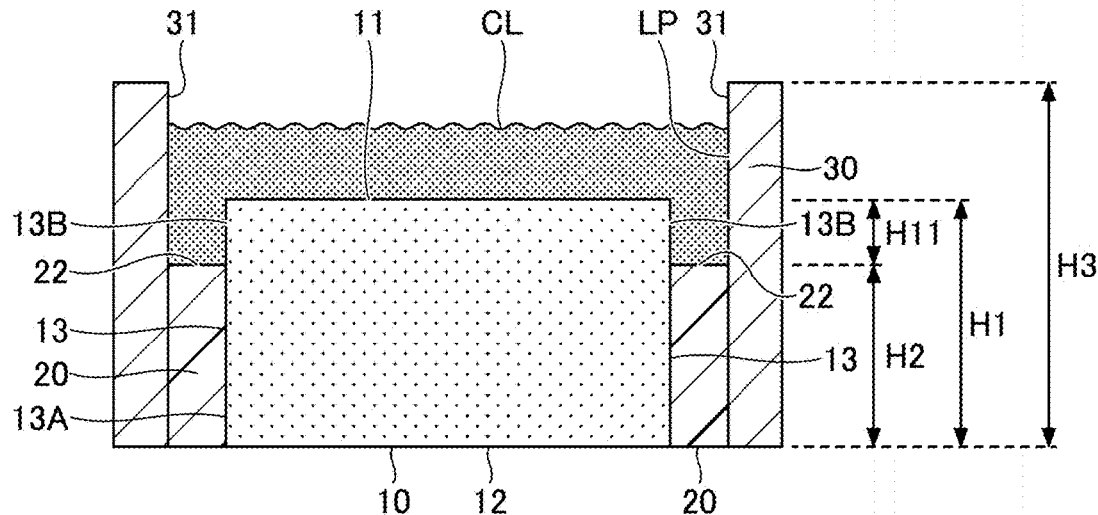
FIG. 3 is a cross-sectional view illustrating a second embodiment of a method of coloring a dental block.
Figure 4:
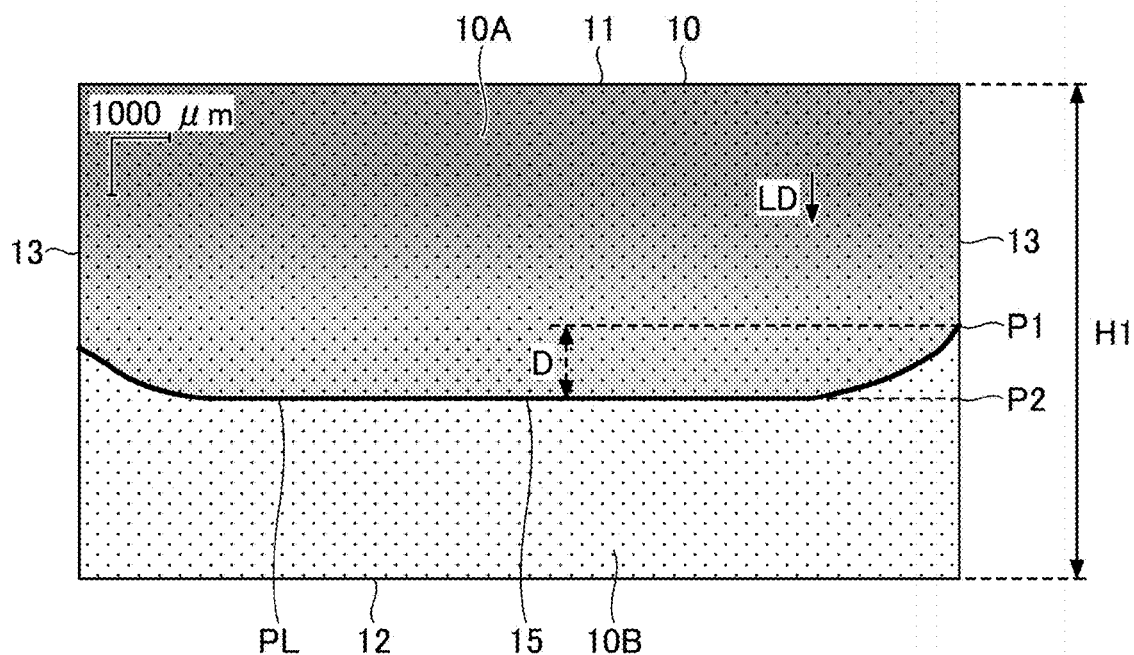
FIG. 4 is a view illustrating a side surface of the dental block colored in the second embodiment.

FIG. 3 is a cross-sectional view illustrating a second embodiment of a method of coloring a dental block, and FIG. 4 is a view illustrating a side surface of the dental block colored in the second embodiment. In FIGS. 3 and 4, the same reference numerals or the corresponding reference numerals may be indicated to portions common to FIGS. 1 and 2, and explanations thereof may be omitted.

In the second embodiment, a portion 13A close to the bottom surface 12 of the side surface 13 of the dental block 10 is covered with a covering material 20 over the entire circumference, a portion 13B close to the top surface 11 of the side surface 13 is exposed, and the coloring liquid CL penetrates from the top surface 11 and the portion 13B close to the top surface 11 on the side surface 13.

Specifically, a portion 13A close to the bottom surface 12 of the side surface 13 of the dental block 10 is covered with a covering material 20 of which a height H2 is lower than a height H1 of the dental block 10, so that the top surface 11 and the portion 13B close to the top surface 11 of the side surface 13 are exposed. Further, a guard member 30 in which a height H3 is higher than the height H1 of the dental block 10 covers the outside of the covering material 20 in the circumferential direction by leaving a gap between the portion 13B close to the top surface 11 of the side surface 13 and the guard member 30 (FIG. 3).

Thus, a liquid pool LP is formed in a space formed by the top surface 11 and the portion 13B close to the top surface 11 of the side surface 13 of the dental block 10, an upper end 22 of the covering material 20, and the guard member 30. When the coloring liquid CL is stored in the liquid pool LP, the coloring liquid CL penetrates into the dental block 10 from the top surface 11 and the portion 13B close to the top surface of the side surface 13 (FIG. 3).

In the second embodiment, as described above, the portion 13A close to the bottom surface 12 of the side surface 13 of the dental block 10 is covered with the covering material 20 over the entire circumference, and the portion 13B close to the top surface 11 of the side surface 13 is exposed, whereby the coloring liquid CL penetrates from the top surface 11 and the portion 13B close to the top surface 11 of the side surface 13 (FIG. 3).

Thus, in the second embodiment, the distance D between the boundary P1 close to the side surface 13 and the boundary P2 close to the center 15 can be further shortened, and a dental block in which the boundary surface (colored surface) PL further does not readily curve can be provided. As a result, in the second embodiment, further deterioration of aesthetics can be prevented (FIG. 4).

Further, in the second embodiment, a length H11 of the portion 13B close to the top surface 11 exposed towards the top surface 11 of the side surface 13 in the height direction of the dental block 10 is not limited. The length H11 of the portion 13B close to the top surface 11 exposed towards the top surface 11 of the side surface 13 is preferably 40% or less of the total length (height H1) of the side surface 13 in the height direction, more preferably 30% or less, and even more preferably 25% or less.

In the second embodiment, when the length H11 of the portion 13B close to the top surface 11 exposed towards the top surface 11 of the side surface 13 of the dental block 10 in the height direction is reduced to 40% or less of the total length (height H1) of the side surface 13 in the height direction, the distance D between the boundary P1 close to the side surface 13 and the boundary P2 close to the center 15 can be further shortened (FIG. 3 and FIG. 4).

Thus, in the second embodiment, the dental block in which the boundary surface (colored surface) PL does not readily curve can be provided. As a result, in the second embodiment, further deterioration of aesthetics can be prevented (FIG. 4).

Third Embodiment

Figure 5:
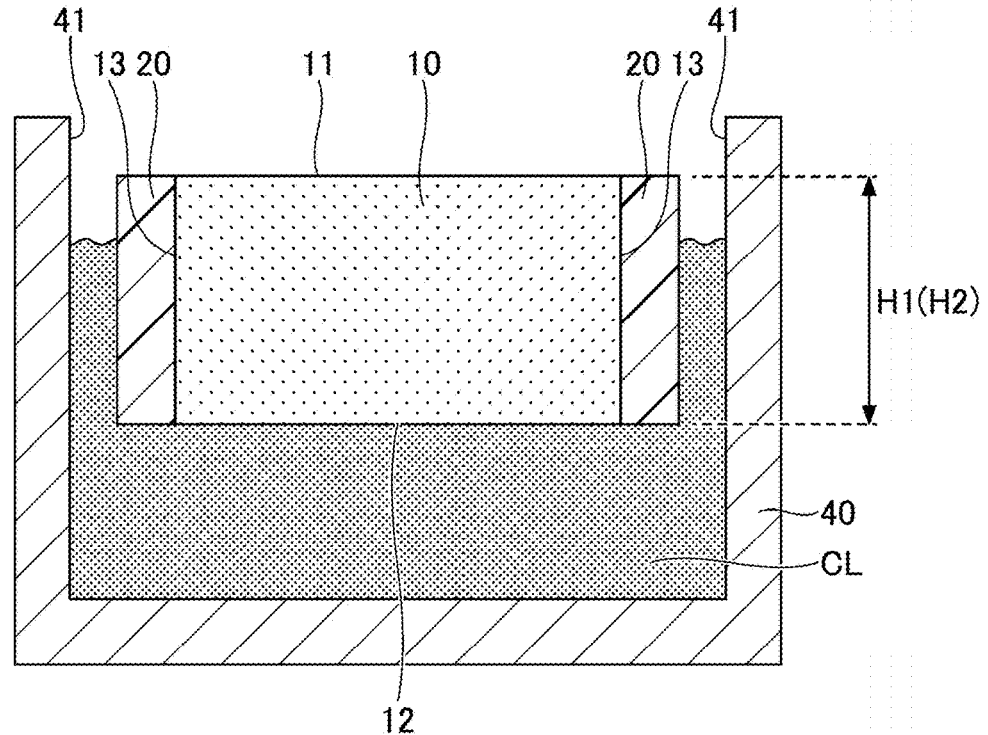
FIG. 5 is a cross-sectional view illustrating a third embodiment of a method of coloring a dental block.
Figure 6:
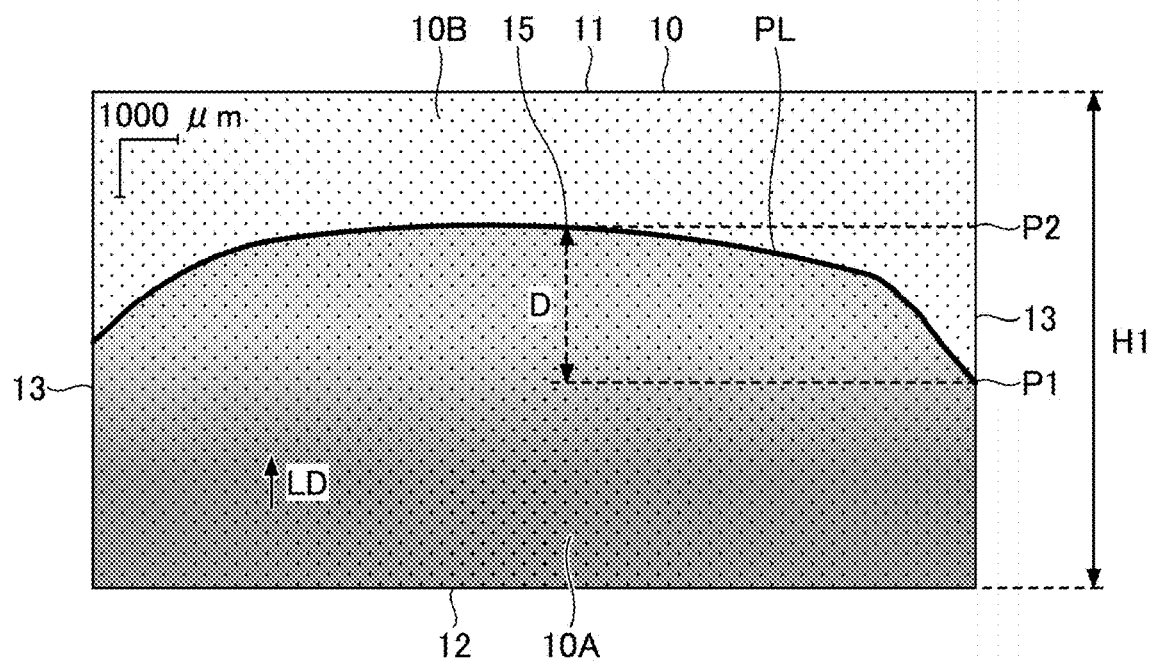
FIG. 6 is a view illustrating a side surface of the dental block colored in the third embodiment.

FIG. 5 is a cross-sectional view illustrating a third embodiment of a method of coloring a dental block. FIG. 6 is a view illustrating a side surface of a dental block colored in the third embodiment. In FIGS. 5 and 6, portions common to FIGS. 1 and 2 may be denoted by the same or corresponding reference numerals, and description thereof may be omitted.

In the third embodiment, the entire side surface 13 of the dental block 10 is covered with the covering material 20 in a state in which the top surface 11 and the bottom surface 12 of the dental block 10 are exposed, and the coloring liquid CL penetrates from the bottom surface 12.

Specifically, the height H2 of the covering material 20 is substantially the same as the height H1 of the dental block 10, and the entire side surface 13 of the dental block 10 is covered with the covering material 20. On the other hand, a container 40 having a circumferential dimension larger than the entire side surface 13 of the dental block 10 being covered with the covering material 20 (hereinafter referred to as a whole covering block) and having a height sufficiently higher than the height H1 of the dental block 10 (the height H2 of the covering material 20) is prepared, and the coloring liquid CL is injected into the container (FIG. 5).

The entire covering block is immersed in the coloring liquid CL filled in the container 40, and the entire covering block is held so that only the bottom surface 12 of the dental block 10 is exposed to the coloring liquid CL (the top surface 11 is not exposed to the coloring liquid CL). The mode of holding the entire covering block is not particularly limited, for example, the entire covering block may be suspended from above in the height direction, and the entire covering block may be fixed to the container 40 with a jig (not shown).

When the coloring liquid CL penetrates the dental block 10 from the bottom surface 12, as illustrated in FIG. 6, a colored region 10A close to the bottom surface 12 of the dental block 10 and a non-colored region 10B close to the top surface 11 of the dental block 10 are formed. In the third embodiment, a boundary surface PL between the colored region 10A and the non-colored region 10B constitutes a curved shape whose cross-sectional shape becomes convex towards the top surface 11.

Again, in this case, a curved surface (curved line of the cross-section) of the boundary surface PL is formed so that the distance D between the boundary P1 close to the side surface 13 and the boundary P2 close to the center 15 in the dental block 10 increases from the side surface 13 toward the center 15.

In the third embodiment, as described above, the entire side surface 13 is covered with the covering material 20 over the entire circumference in a state in which the top surface 11 and the bottom surface 12 are exposed, and the coloring liquid CL penetrates from the bottom surface 12, thereby shortening the distance D between the boundary P1 close to the side surface 13 and the boundary P2 close to the center 15 (FIG. 5 and FIG. 6).

Thus, in the third embodiment, the dental block in which the boundary surface (colored surface) PL does not readily curve can be provided even when the coloring liquid CL penetrates from the bottom surface 12. As a result, in the third embodiment, deterioration of aesthetics can be prevented (FIG. 6).

Fourth Embodiment

Figure 7:
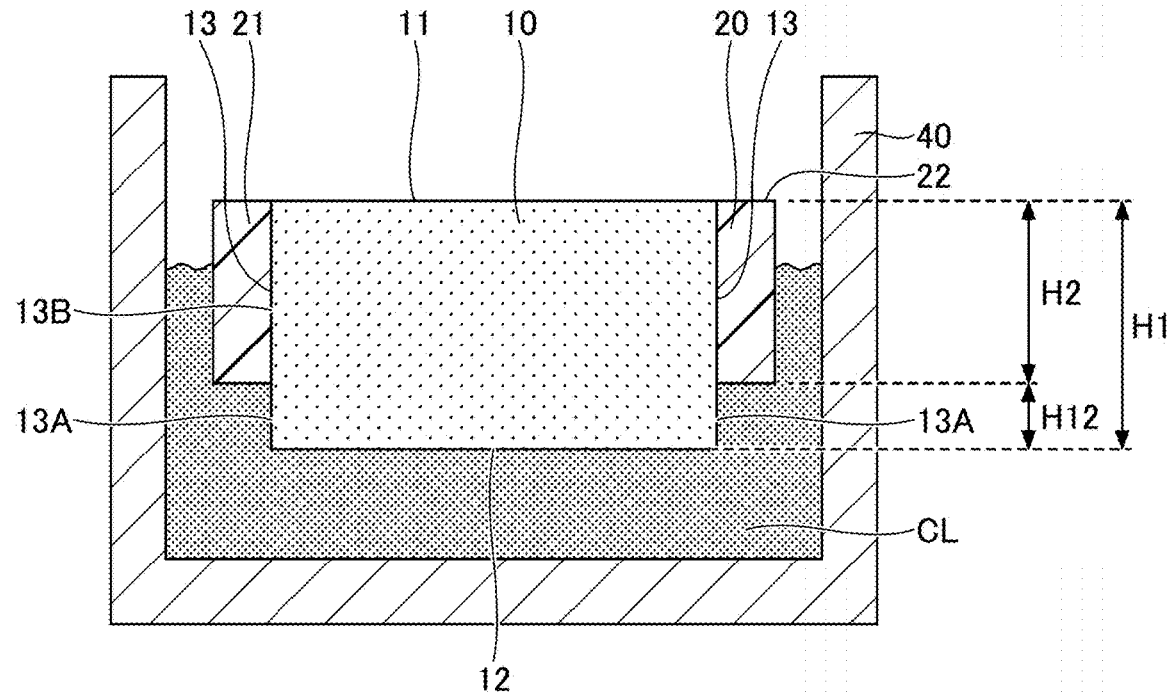
FIG. 7 is a cross-sectional view illustrating a fourth embodiment of a method of coloring a dental block.
Figure 8:
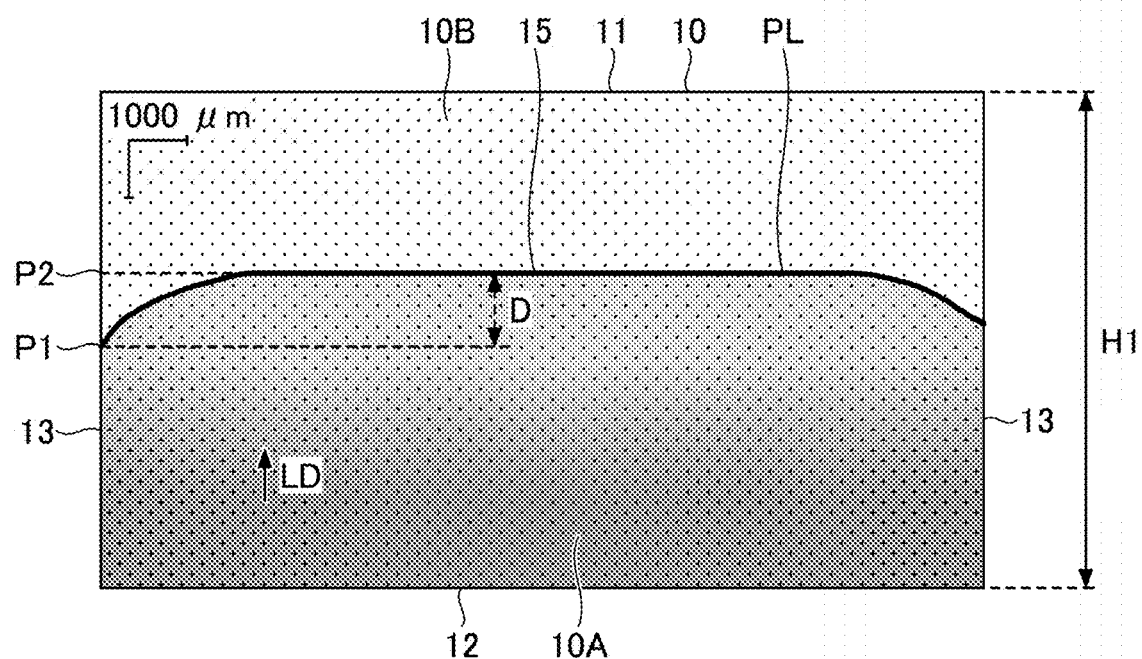
FIG. 8 is a view illustrating a side surface of the dental block colored in the fourth embodiment.

FIG. 7 is a cross-sectional view illustrating a fourth embodiment of a method of coloring a dental block, and FIG. 8 is a view illustrating a side surface of the dental block colored in the fourth embodiment. In FIGS. 7 and 8, portions common to FIGS. 1, 2, 5, and 6 may be denoted by the same reference numerals or the corresponding reference numerals and the description thereof may be omitted.

In the fourth embodiment, a portion 13B close to the top surface 11 of the side surface 13 of the dental block 10 is covered with a covering material 20 over the entire circumference, a portion 13A close to the bottom surface 12 of the side surface 13 is exposed, and the coloring liquid CL penetrates from the bottom surface 12 and the portion 13A close to the bottom surface 12 of the side surface 13.

Specifically, the portion 13B close to the top surface 11 of the side surface 13 of the dental block 10 is covered with a covering material 20 in which a height H2 is smaller than a height H1 of the dental block 10, so that the portion 13A close to the bottom surface 12 of the side surface 13 of the dental block 10 is exposed.

The portion 13B close to the top surface 11 of the side surface 13 of the dental block 10 is covered with the covering material 20 (hereinafter referred to as an upper covered block) is immersed in the coloring liquid CL filled in the container 40. The upper covered block is held in the container 40 so that only the bottom surface 12 and the portion 13A close to the bottom surface 12 of the side surface 13 of the dental block 10 are exposed to the coloring liquid CL (the top surface 11 is not exposed to the coloring liquid CL).

In the fourth embodiment, as described above, the portion 13B close to the top surface 11 of the side surface 13 of the dental block 10 is covered with the covering material 20 over the entire circumference, and the portion 13A close to the bottom surface 12 of the side surface 13 is exposed. As a result, the coloring liquid CL penetrates from the bottom surface 12 and the portion 13A close to the bottom surface 12 of the side surface 13 (FIG. 7 and FIG. 8).

Thus, even when the coloring liquid CL penetrates from the bottom surface 12, a distance D between a boundary P1 close to the side surface 13 of the dental block 10 and a boundary P2 close to the center 15 can be further shortened. Therefore, in the fourth embodiment, a dental block in which the boundary surface (colored surface) PL does not readily curve can be provided. As a result, in the fourth embodiment, further deterioration of aesthetics can be prevented (FIG. 8).

Further, in the fourth embodiment, a height H12 of the portion 13A close to the bottom surface 12 exposed towards the bottom surface 12 of the side surface 13 in the height direction of the dental block 10 is not limited. The length H12 of the portion 13A close to the bottom surface 12 exposed towards the bottom surface 12 of the side surface 13 is preferably 40% or less of the total length (height H1) of the side surface 13 in the height direction, more preferably 30% or less, and even more preferably 25% or less.

In the fourth embodiment, when the length H12 of the portion 13A close to the bottom surface 12 exposed towards the bottom surface 12 of the side surface 13 of the dental block 10 in the height direction is reduced to 40% or less of the total length (height H1) of the side surface 13 in the height direction, the distance D between a boundary P1 close to the side surface 13 and a boundary P2 close to the center 15 can be further shortened (FIG. 7 and FIG. 8).

Thus, in the fourth embodiment, a dental block in which the boundary surface (colored surface) PL does not readily curve can be provided. As a result, in the fourth embodiment, further deterioration of aesthetics can be prevented (FIG. 8).

Dental Block

The dental block of this present embodiment is a dental block 10 obtained by the above-described method of coloring the dental block.

That is, the dental block 10 of the present embodiment is obtained by covering at least a portion of the side surface 13 of the dental block 10 with the covering material 20 over the entire circumference, exposing the top surface 11 and the bottom surface 12, and allowing the coloring liquid to penetrate from the top surface 11 or the bottom surface 12.

Thus, in the dental block 10 of the present embodiment, the effect obtained by the method of coloring the dental block described above can also be obtained in the dental block 10.

That is, in the dental block 10 of the present embodiment, as described above, the distance D between the boundary P1 close to the side surface 13 and the boundary P2 close to the center 15 can be shortened by covering at least a portion of the side surface 13 with the covering material 20 over the entire circumference in a state in which the top surface 11 and bottom surface 12 are exposed, and allowing the coloring liquid CL to penetrate from the top surface 11 or bottom surface 12.

Thus, in the dental block of the present embodiment, when the coloring liquid CL penetrates from the top surface 11 or bottom surface 12, the boundary surface (colored surface) PL that does not readily curve can be obtained. As a result, in the dental block of the present embodiment, the deterioration of aesthetics can be prevented.

EXAMPLES

Hereinafter, the present invention will be described with reference to further examples. Examples and Comparative Examples were evaluated by the following tests.

Preparation of Test Specimens and Sintered Bodies

Example 1

A rectangular parallelepiped was carved out of a commercially available zirconia pre-sintered body (Aadva (Registered Trademark) Zirconia Disc EI, manufactured by GC Corporation) for dental cutting using a cutting machine to form a test specimen (dental block) 10. Using a silicone rubber impression material (Duplicone (Registered Trademark), manufactured by Shofu Co., Ltd.), a covering material 20 was formed to cover only an entire side surface 13 without blocking (exposing) a bottom surface 12 of the test specimen 10.

When forming the covering material 20, a wall 21 is formed by making an enclosure of the portion covering the side surface 13 of the test specimen 10 higher than the top surface 11 of the test specimen 10, and a liquid pool LP for pooling the coloring liquid CL is formed. The coloring liquid CL is poured into the liquid pool LP of the coloring liquid, and the coloring liquid CL is soaked into the inside of the test specimen 10 and colored by holding for 18 hours (See FIG. 1 and FIG. 2).

As the coloring liquid CL, a commercially available coloring liquid for dental ceramics (Aadva (Registered Trademark) Zirconia Color Liquid AZ5, manufactured by GC Corporation) mainly containing water, polyethylene glycol, iron chloride, and erbium chloride was used.

The colored specimen 10 was sliced to a thickness of 1.5 mm with an automatic precision cutting machine (IsoMet High-Speed Pro, manufactured by BUEHLER) and dried at 60° C. for 1 to 3 hours. The dried test specimen 10 was baked at 1,500° C. for 2 hours to obtain a sintered body. The conditions and results of Example 1 are indicated in Table 1.

Degree of Curvature

The resulting sintered body was photographed with a digital microscope (VHX (Registered Trademark)-J20, manufactured by Keyence Corporation). Image analysis software, imageJ, was used for image analysis. The image was converted to 8-bit grayscale and binarized using the "Default" automatic threshold setting to clarify a color border formed by the coloring liquid penetration and to draw an arc-shaped curve PL, along the color border.

The distance D between a line (line between the center 15 and P2) parallel to the top surface 11 of the test specimen 10 through the most protruded point of the curved line PL (center 15 of the specimen 10) and a line parallel to the top surface 11 of the test specimen 10 through the intersection P1 with the side surface 13 of the test specimen 10 was calculated (see FIG. 2). The ratio P[%]=100×(D/H1) of the height H1 and the distance D of the test specimen 10 was calculated, and the resulting value was used as an index indicating the degree of curvature of the colored surface (curved line) PL. The degree of curvature was determined to be good when the degree of curvature was 12% or less, and poor when the degree of curvature exceeded 12%.

Sensory Evaluation

In addition, whether the degree of curvature of the colored surface (curved line) PL is clinically acceptable or not was visually evaluated at four levels. Number of samples was set to 5 and was evaluated by the following criteria. A rating of 3 or higher was determined as good, and a rating of 2 or lower was determined as poor.

Evaluation Criteria

4: The colored surface is horizontal
3: The colored surface is horizontal except for both ends
2: The colored surface is curved
1: The colored surface is highly curved Example 2

The test specimen 10 and the sintered body were prepared and evaluated in the same manner as in Example 1 (see FIG. 3 and FIG. 4), except that the covering material 20 was formed so as to be exposed to a height of ¼ (25% of the height H1 of the test specimen 10) from the top surface 11 of the test specimen 10, and a guard member 30 was formed by covering the outside of the covering material 20 with a silicone rubber impression material (Duplicone (Registered Trademark), manufactured by Shofu Co., Ltd.), and a wall 31 was formed by raising a height H3 of the guard member 30 to the height H1 of the top surface 11 of the test specimen, and a liquid pool LP for pooling the colored liquid CL was formed. The conditions and results of Example 2 are indicated in Table 1.

Example 3

The test specimen 10 and the sintered body were prepared and evaluated in the same manner as in Example 2 (see FIG. 3 and FIG. 4), except that the exposure of the test specimen 10 in forming the covering material 20 was changed from the top surface 11 to a height of ⅛ (12.5% of the height H1 of the test specimen 10). The conditions and results of Example 3 are indicated in Table 1.

Example 4

The test specimen 10 and the sintered body were prepared and evaluated in the same manner as in Example 1 (see FIG. 5 and FIG. 6), except that the coloring liquid CL was poured into a container 40 having a circumferential dimension larger than that of the covering material 20 covering the entire side surface 13 of the test specimen 10 (the covered block) and a height sufficiently higher than the height H1 of the test specimen 10 (the height H2 of the covering material 20), and the covered block was immersed in the coloring liquid CL and held for 18 hours so that only the bottom surface 12 of the test specimen 10 was exposed to the coloring liquid CL (the top surface 11 was not exposed to the coloring liquid CL). The conditions and results of Example 4 are indicated in Table 1.

Example 5

The test specimen 10 and sintered body were prepared and evaluated in the same manner as in Example 4 (see FIG. 7 and FIG. 8), except that the covering material 20 was formed so as to be exposed from the bottom surface 12 of the test specimen 10 to a height of ¼ (25% of the height H1 of the test specimen 10), and the covering block was immersed in the coloring liquid CL so that only the bottom surface 12 and a portion 13A of the exposed side surface 13 of the test specimen 10 were exposed to the coloring liquid CL (the top surface 11 was not exposed to the coloring liquid CL). The conditions and results of Example 5 are indicated in Table 1.

Example 6

The test specimen 10 and the sintered body were prepared and evaluated in the same manner as in Example 5, except that the exposure of the test specimen 10 in forming the covering material 20 was changed from the bottom surface 12 to a height of ⅛ (12.5% of the height H1 of the test specimen 10). The conditions and results of Example 6 are indicated in Table 1.

Example 7

The test specimen 10 and the sintered body were prepared and evaluated in the same manner as in Example 5 (see FIG. 7 and FIG. 8), except that uniaxial pressure molding was performed at a pressure of 10 MPa using commercially available partially stabilized zirconia powder (Zpex (Registered Trademark), manufactured by Tosoh Corporation) as the raw material powder, and then cold isostatic pressing (CIP) was performed at a pressure of 200 MPa to prepare a rectangular parallelepiped body, the test specimen 10 was degreased by calcination at 450° C. for 1 hour, followed by calcination at 1050° C. for 2 hours to obtain a pre-sintered body. The conditions and results of Example 7 are indicated in Table 1.

Comparative Example 1

Figure 9:
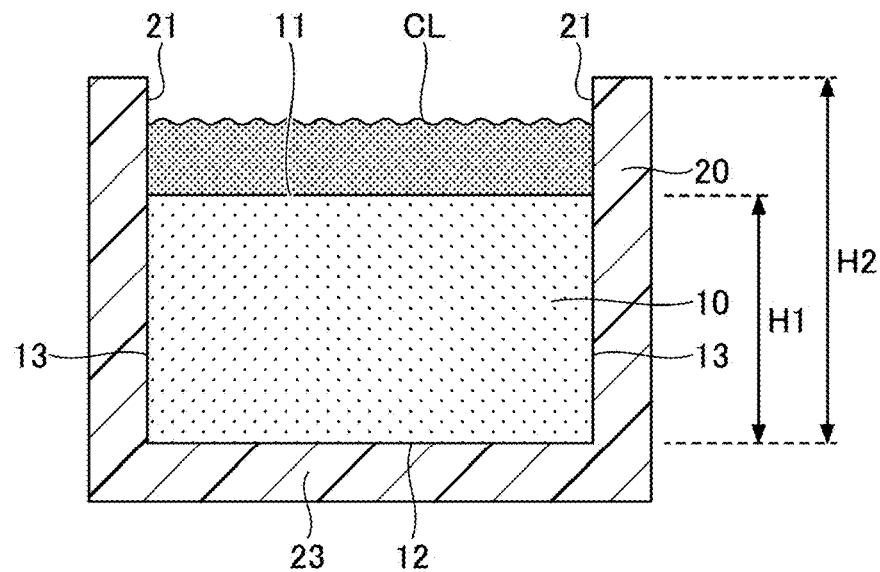
FIG. 9 is a cross-sectional view illustrating a conventional method of coloring a dental block.
Figure 10:
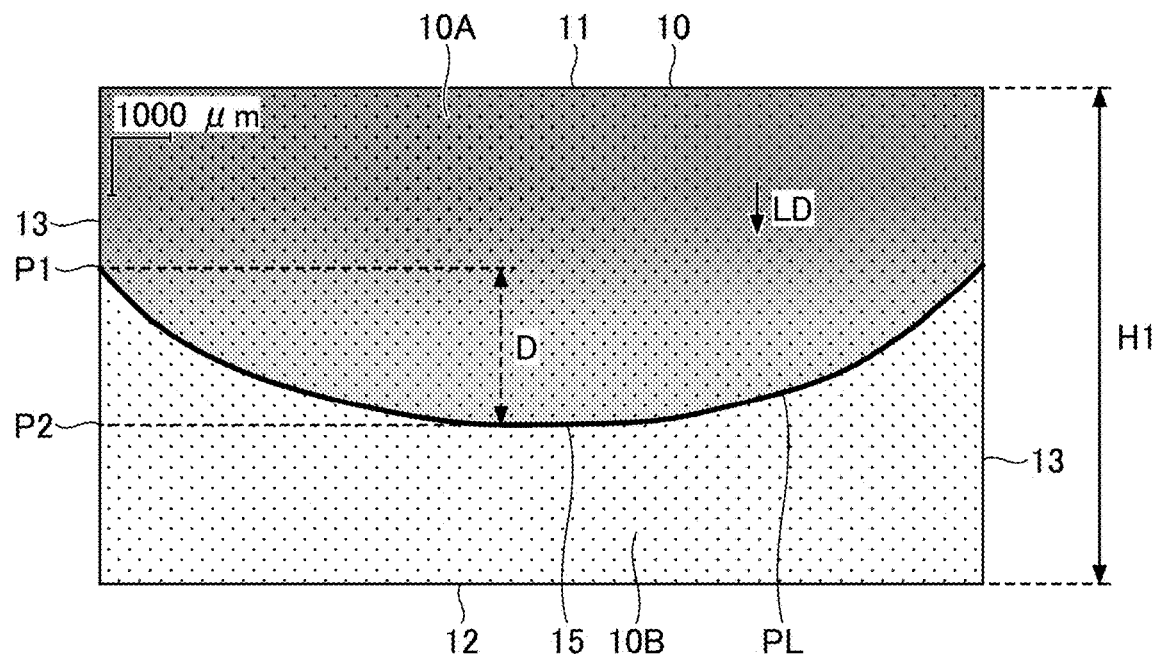
FIG. 10 is a view illustrating a side surface of the dental block colored in the conventional method.

The test specimen 10 and the sintered body were prepared and evaluated in the same manner as in Example 1 (see FIG. 9 and FIG. 10), except that when forming the covering material 20, the bottom surface 12 of the test specimen 10 was blocked (not exposed), and the covering material 20 (a bottom surface 23 of the covering material) was formed to cover the entire side surface 13 and the bottom surface 12 of the test specimen 10. The conditions and results of Comparative Example 1 are indicated in Table 1.

Comparative Example 2

Figure 11:
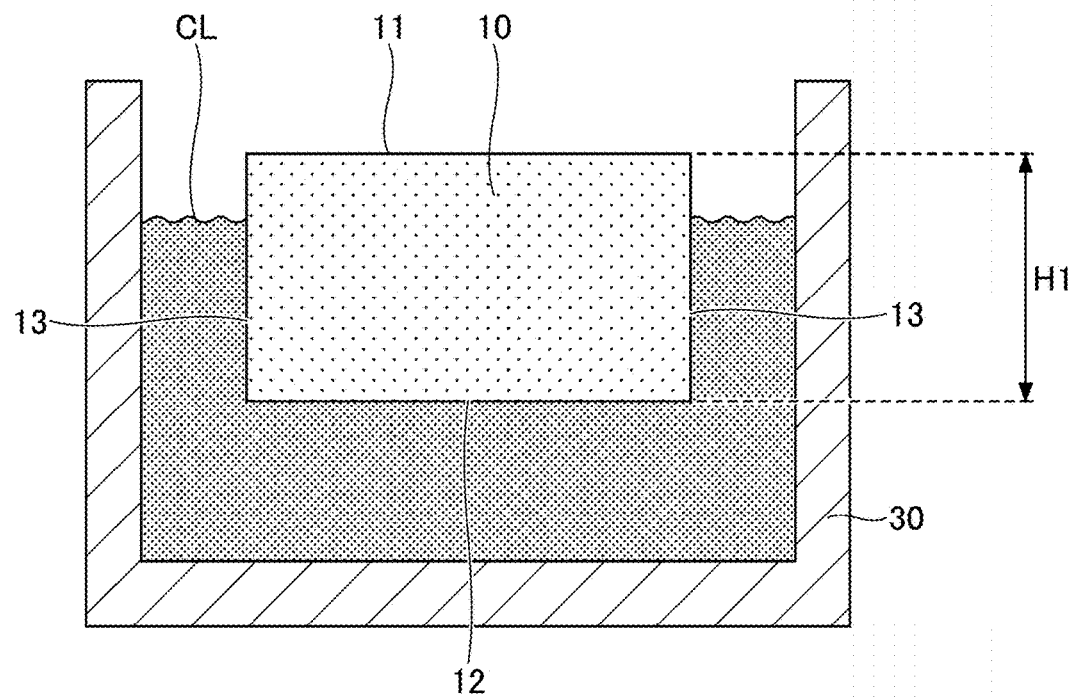
FIG. 11 is a cross-sectional view illustrating an embodiment of a comparative example to demonstrate an effect of a covering material.
Figure 12:
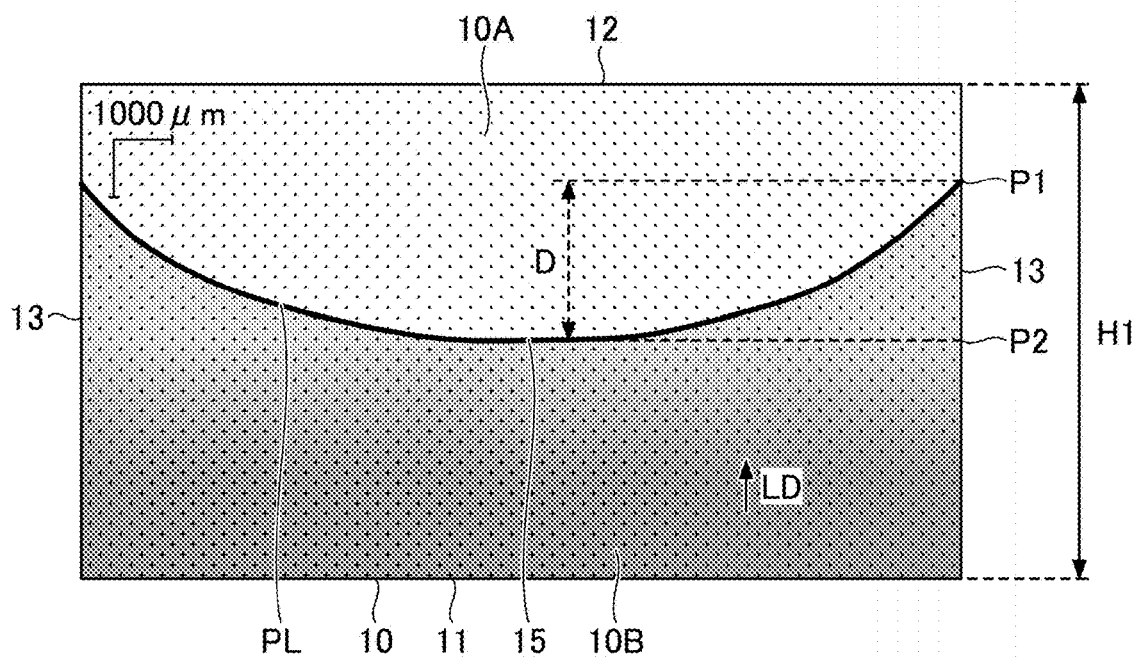
FIG. 12 is a view illustrating a side surface of the dental block colored in the embodiment of the comparative example to demonstrate the effect of the covering material.

The test specimen 10 and the sintered body were prepared and evaluated in the same manner as in Example 4 except that the test specimen 10 was immersed in the coloring liquid CL without any treatment on the top surface 11, side surface 13, and bottom surface 12 of the test specimen 10 and held for 9 hours (see FIG. 11 and FIG. 12). The conditions and results of Comparative Example 2 are indicated in Table 1.

TABLE 1

| | Block | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Conditions | Processing | Cutting | Cutting | Cutting | Cutting | Cutting | Cutting | Pressure molding | Cutting | Cutting |
| | Portion being covered | Side surface | Side surface (¼ exposed from top surface) | Side surface (⅛ exposed from top surface) | Side surface | Side surface (¼ exposed from bottom surface) | Side surface (⅛ exposed from bottom surface) | Side surface (⅛ exposed from bottom surface) | Side surface + Bottom surface | — |
| | Portion being immersed | Top surface | Top surface + a portion of side surface close to the top surface | Top surface + a portion of side surface close to the top surface | Bottom surface | Bottom surface + a portion of side surface close to the bottom surface | Bottom surface + a portion of side surface close to the bottom surface | Bottom surface + a portion of side surface close to the bottom surface | Top surface | Bottom surface + a portion of side surface close to the bottom surface |
| Results | Degree of curvature | 11.5% | 7.8% | 3.5% | 11.0% | 8.3% | 3.8% | 8.5% | 12.5% | 30.7% |
| | Visual sensory evaluation | 3 | 3 | 4 | 3 | 3 | 4 | 3 | 2 | 1 |

Table 1 indicates that the test piece (dental block), in which at least a part of the side surface 13 of the test specimen 10 is covered with the covering material 20 over the entire circumference, the top surface 11 and the bottom surface 12 are exposed, and the coloring liquid CL penetrates from the top surface 11 or the bottom surface 12, has good curvature and sensory evaluation (Examples 1 to 7).

In contrast, the test specimen 10, in which the side surface 13 is only covered with the covering material 20 without exposing the bottom surface 12 of the test specimen 10, and the test specimen 10, in which the side surface 13 of the test specimen 10 is not covered with the covering material 20, have poor curvature and sensory evaluation (Comparative Examples 1 and 2).

Although embodiments of the present invention have been described above, the present invention is not limited to specific embodiments, and various variations and modifications can be made within the scope of the invention described in the claims.

This application claims priority under Japanese Patent Application No. 2021-162425 filed on Sep. 30, 2021, the entire contents of which are hereby incorporated herein.

DESCRIPTION OF THE REFERENCE NUMERALS

10 Dental block (test specimen)
11 Top surface
12 Bottom surface
13 Side surface
20 Covering material
21 Wall
22 Upper end
30 Guard member
31 Wall
40 Container
H1, H2, H3, H11, H12 Height

The invention claimed is:

1. A method of coloring a dental block by which a coloring liquid penetrates into the dental block including a top surface, a bottom surface, and a side surface,
the method comprising:
covering at least a portion of the side surface with a covering material over an entire circumference of the portion;
exposing the top surface and the bottom surface; and
causing the coloring liquid to penetrate from the top surface or the bottom surface.

2. The method of coloring the dental block according to claim 1,
wherein the entire circumference of a portion of the side surface close to the bottom surface is covered with the covering material, and a portion of the side surface close to the top surface is exposed, and
wherein the coloring liquid penetrates from the top surface and the portion of the side surface close to the top surface.

3. The method of coloring the dental block according to claim 2,
wherein a length, in a height direction of the dental block, of the portion close to the top surface exposed towards the top surface of the side surface is 40% or less of a total length of the side surface in the height direction.

4. The method of coloring the dental block according to claim 1,
wherein the entire circumference of a portion of the side surface close to the top surface is covered with the covering material, and a portion of the side surface close to the bottom surface is exposed, and
wherein the coloring liquid penetrates from the bottom surface and the portion of the side surface close to the bottom surface.

5. The method of coloring the dental block according to claim 4, wherein a length, in a height direction of the dental block, of the portion close to the bottom surface exposed towards the bottom surface of the side surface is 40% or less of a total length of the side surface in the height direction.

6. The method of coloring the dental block according to claim 1, wherein the dental block is composed of a molded body formed after temporary firing the molded body but before fully firing the molded body.

7. The method of coloring the dental block according to claim 1, wherein the covering material is formed of a flexible material.

8. A dental block obtained by the method of coloring according to claim 1.

* * * * *